Patented Sept. 29, 1953

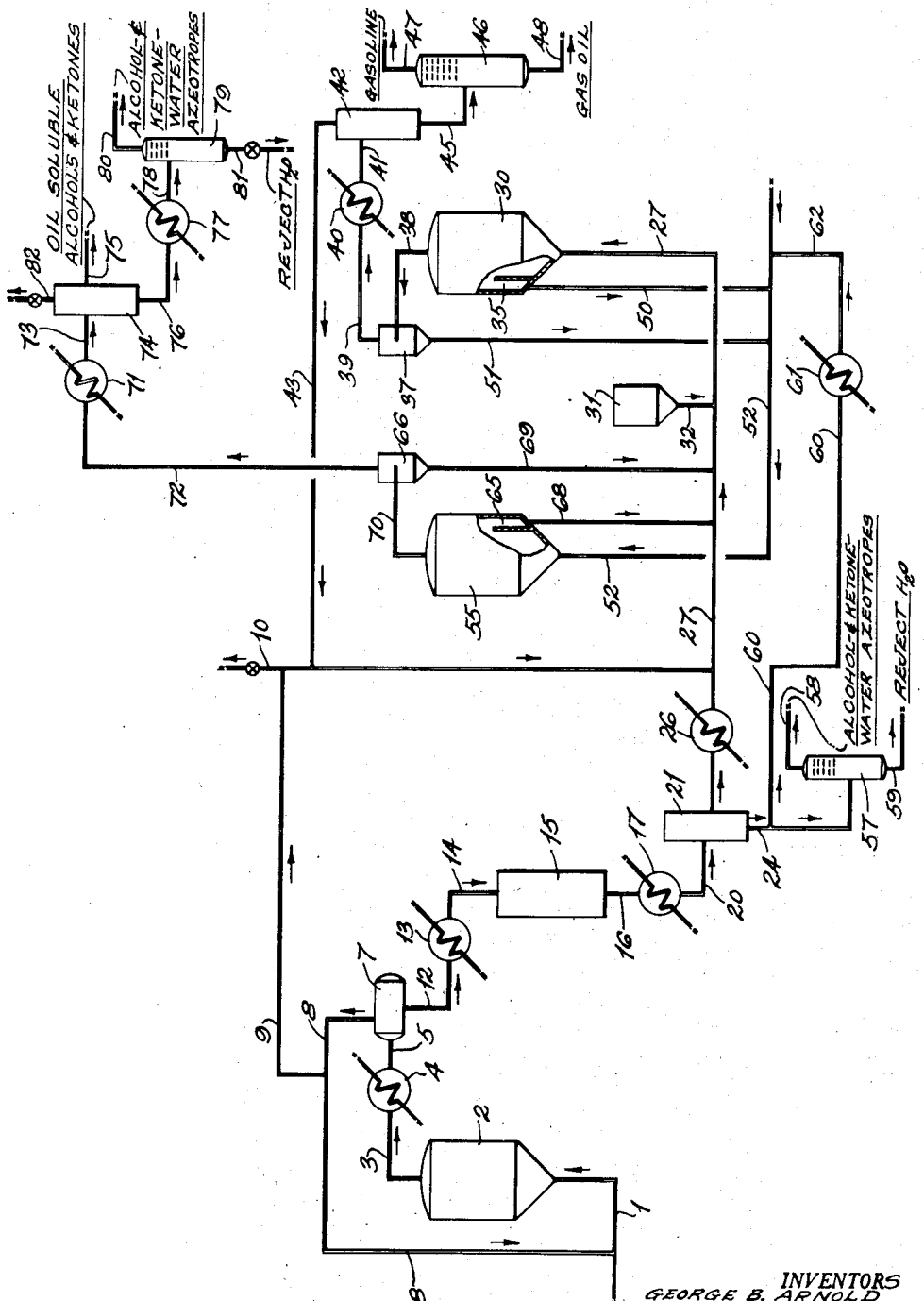

2,653,960

UNITED STATES PATENT OFFICE 2,653,960

PROCESS FOR TREATING SYNTHESIS PRODUCT

Howard V. Hess, Beacon, George B. Arnold, Glenham, and Marvin L. Drabkin, New York, N. Y., assignors to The Texas Company, New York, N. Y., a corporation of Delaware Application March 26, 1949, Serial No. 83,732

7 Claims. (Cl. 260—450)

This invention relates to a method for treating the product obtained in the catalytic conversion of synthesis gas into synthetic fuel. More specifically, the invention discloses a method for separating oxygen-containing organic compounds from synthesis product.

In our copending application, Serial No. 68,463, filed December 31, 1948, entitled Treatment of Entire Liquid Product in Vapor Phase with Basic Compounds, there is disclosed a process for treating the product obtained by the catalytic conversion of carbon monoxide and hydrogen into synthetic fuel by contacting it in the vapor phase at a temperature of 500 to 1,000° F. with a basic material such as basic alkali metal compounds, alkaline earth metal compounds and mixtures thereof. The vapor phase basic treatment of synthesis product effects hydrolysis of esters to alcohols and acids and decarboxylation of acids to hydrocarbons or ketones. The recovery of oxygen-containing organic compounds is expedited by conversion of esters and acids to alcohols, hydrocarbons and ketones in accordance with the aforedescribed vapor phase basic treatment of the synthesis product. In still another copending application, namely, Serial No. 60,234, filed November 16, 1948, and entitled Process for Separating Liquid Polar Compounds from Less Polar Liquid Compounds, of which two of us are co-inventors, there is disclosed a process for separating polar liquid compounds from less polar liquid compounds by contacting a mixture thereof in the vapor phase with a particulate adsorbent which is maintained in a fluent state. Polar compounds are adsorbed on the particulate fluent adsorbent and are recovered therefrom by contacting the adsorbent with a desorbing gas after the adsorbent has been separated from the vaporized mixture. This procedure for separating polar compounds from less polar compounds is particularly useful and applicable to the separation of oxygen-containing organic compounds from gasoline and gas oil fractions of a product obtained by the catalytic conversion of carbon monoxide and hydrogen into synthetic fuel.

This invention combines the processes of the above two copending applications into an integrated process containing several cooperative features and thereby expedites the recovery of oxygen-containing organic compounds from synthesis product.

In accordance with this invention, the total synthesis product obtained by the catalytic conversion of carbon monoxide and hydrogen into synthetic fuel is separated into a gas phase and a liquid phase; advantageously, this separation into gas and liquid phases is effected at a temperature between 150 and 300° F. and at synthesis pressure, i. e., at a pressure between 100 and 500 pounds per square inch. The gas phase is used as recycle to the synthesis reaction. The total liquid phase is contacted with a basic compound of an alkali metal or of an alkaline earth metal or with mixtures of such basic compounds whereby oil- and water-soluble esters are hydrolyzed to alcohols and acids and oil- and water-soluble acids are decarboxylated to hydrocarbons or ketones. The base-treated liquid phase is cooled and separated into a water phase and an oil phase. The oil phase is then vaporized and contacted with an adsorbent maintained in a fluent state whereby alcohols and ketones present in the oil phase are adsorbed on the fluent adsorbent. Advantageously, a portion of recycled gas phase is employed as a gaseous diluent to aid in the fluidization of the adsorbent and to help maintain the hydrocarbon phase in the vapor state in the adsorption zone. The adsorbent is separated from the vaporized oil phase and is introduced into a desorption zone wherein alcohols and ketones are removed therefrom by contacting the adsorbent material with a desorbing gas at an elevated temperature while the adsorbent is maintained in a fluent state. Base-treated water phase which has been converted into steam is the preferred gas for desorption of oil-soluble alcohols and ketones from the adsorbent in the desorption zone.

The catalytic conversion of carbon monoxide and hydrogen into synthetic fuel by contact with a fluidized iron catalyst at an elevated temperature of 500 to 750° F. and at a pressure of 100 to 500 pounds per square inch results in the formation of a product mixture comprising a gas phase and a liquid phase, the latter consisting of approximately one part oil phase and two parts water phase. Oxygen-containing organic compounds such as alcohols, acids, esters, ketones and aldehydes are distributed throughout the two-phase liquid product; the molecular weight of the oxygen-containing compounds determines whether they are primarily found in the water phase or in the oil phase. The oxygen-containing organic compounds ordinarily found in the water phase comprise lower molecular weight compounds such as $C_1$ to $C_6$ alcohols, esters containing up to about 4 carbon atoms, $C_2$ to $C_6$ organic acids and traces of higher molecular weight oxygenated compounds. The oxygen-containing organic compounds ordinarily found in the oil phase comprise higher molecular weight compounds such as $C_4$ and higher alcohols, esters containing more than 3 carbon atoms, $C_3$ and higher organic acids and traces of lower molecular weight compounds. The substantial overlapping in the distribution of the oxygen-containing organic compounds is attributable to the fact that compounds of intermediate molecular weight such as $C_5$ alcohols are found in substantial portion in both oil and water phases. The disposal of the water phase in large-scale commercial operations is a serious problem since the oxygen-containing organic compounds comprise as high as 20 per cent of the water phase and their presence would seriously pollute the stream into which the water phase is emptied. Moreover, the oxygen-containing organic compounds present in both oil and water phases are in demand as chemicals of commerce. The present invention provides an integrated process for purifying the water phase so as to alleviate the problem of its disposal and for recovering from the synthesis product oxygen-containing organic compounds primarily in the form of alcohols.

Treatment of synthesis product in accordance with the combination process of this invention is characterized by a plurality of advantages. First, the reject water obtained by following the combination process of this invention contains less than 0.2 per cent oxygen-containing organic compounds and can be disposed of without causing a serious pollution problem.

A second advantage resides in the fact that the oxygen-containing compounds obtained as a by-product in the formation of synthetic fuel are substantially recovered in the form of alcohols and ketones which greatly simplifies their resolution into individual components. The oxygen-containing compounds are obtained as a mixture comprising approximately 85 per cent alcohols and 15 per cent ketones as a consequence of the combination process of this invention. The resolution of such a mixture is markedly simpler than the resolution of a mixture comprising alcohols, esters, ketones, aldehydes and acids.

A third advantage is realized by the use of a portion of recycle gas phase initially separated from the synthesis product as a diluent in the adsorption zone. The maintenance of the adsorbent in a fluent state and the preservation of the oil phase in the vapor state are substantially aided by the use of recycle gas phase as a diluent.

The vapor phase treatment of the total liquid product comprising oil and water phases with a basic material is effected at a temperature between 500 and 1,000° F. and preferably at a temperature between 700 and 950° F. Atmospheric pressure is advantageously employed for contact of the total liquid phase with a basic material in the vapor state but it is also favorable to employ a pressure corresponding to that used for the conversion of synthesis gas into synthetic fuel, that is, pressures between 100 and 500 pounds per square inch.

The basic material employed for the vapor phase contacting of the liquid phase of synthesis product is selected from basic alkali metal hydroxides, alkali metal oxides, alkali metal salts, alkaline earth metal hydroxides, oxides, salts, etc. Sodium carbonate, sodium phosphate, potassium carbonate, potassium borate are examples of basic alkali metal compounds which can be employed in the process of this invention; calcium oxide, calcium carbonate, barium oxide are examples of basic alkaline earth metal compounds used in this invention. Mixtures of alkali metal and alkaline earth metal compounds may also be employed for the vapor phase basic treatment of the total liquid phase.

The vapor state contacting of the liquid phase with a basic compound is effected at a space velocity between 1 and 10 volumes of liquid product per volume of solid basic material per hour. Space velocities between about 2 and 5 are preferred.

Any of the several techniques for catalytic vapor phase contacting can be employed for the base treatment of the liquid synthesis product. For example, the liquid phase of synthesis product in vapor form can be contacted with a fixed bed, fluidized fixed bed or a stirred bed of basic particles.

The vapor phase base treatment of the liquid synthesis product results in hydrolysis of oil- and water-soluble esters to alcohols and acids and decarboxylation of acids initially present and those formed by ester hydrolysis to either hydrocarbons or ketones. Basic alkali metal compounds effect decarboxylation of acids to hydrocarbons whereas basic alkaline earth metal compounds decarboxylate acids to ketones. The base treatment results in a substantial increase in the alcohol content and a substantial decrease in acid and ester contents of both oil and water phases.

The base-treated liquid synthesis product is cooled and separated into a water phase and an oil phase which is diluted with a small amount of gaseous hydrocarbons, such as ethane, methane, ethylene, propylene, propane, butane, butane, etc. which are produced in the base treatment. Water-soluble alcohols and ketones are separated from the water phase. The oil phase is revaporized and contacted with a fluid bed of adsorbent such as silica gel whereby oxygen-containing organic compounds are separated therefrom by adsorption.

The base-treated oil phase is advantageously separated into a gasoline fraction and a gas oil fraction, each of which is independently contacted with an adsorbent for the oxygen-containing organic compounds contained therein. Separation of the oil phase into gasoline and gas oil fractions and independent treatment of each with a fluent adsorbent facilitates the adsorption and recovery of the alcohols and ketones from the oil phase.

The vaporized oil phase either in toto or, as in the preferred modification, in separate gasoline and gas oil fractions is contacted with an adsorbent which is maintained in a fluent state in an adsorption zone. Fluent state is used to describe maintenance of an adsorbent in a state of continuous motion as distinguished from a stationary bed of the adsorbent. Fluidized fixed bed, suspension contacting wherein the adsorbent is substantially entrained in the vaporized oil phase, and a moving bed are all modifications of fluent operation.

The temperature is maintained between 400 and 700° F. in the adsorption zone. If the gasoline fraction is contacted separately with an adsorbent, the temperature is advantageously maintained in the lower part of the aforedescribed range, that is, between 400 and 500° F. whereas separate contacting of the gas oil fraction with an adsorbent requires temperatures in the upper part of the range, namely, between 550 and 700° F. If the total oil fraction is contacted with the adsorbent, the temperature is advantageously maintained between 600 and 700° F.

The pressure in the adsorption zone is preferably atmospheric but sub-atmospheric and super-atmospheric pressures up to approximately 400 lbs. per square inch can be employed. It is, of course, more difficult to maintain the oil phase in the vapor state at pressures in the upper portion of the aforedescribed range.

The vaporized oil phase is passed through the adsorption zone at a space velocity of approximately 0.5 to 5.0 volumes of liquid oil phase per volume of fluent adsorbent. The space velocity is correlated with the particle size and density of the adsorbent.

The particle size of the adsorbent depends upon the type of fluent operation, adsorbent density and vapor velocity that are employed. Particle size of adsorbent for any particular operation is determined by the vapor velocity; for example, in a fluid bed type operation with vapor velocity of about 1 foot per second, the particle size should be maintained between 50 and 150 mesh.

Fluent adsorbent containing adsorbed oxygen-containing adsorbed compounds which are mainly alcohols and ketones is continuously separated from the vaporized oil phase, removed from the adsorption zone and introduced into the desorption zone. In the desorption zone oxygen-containing organic compounds are desorbed from the adsorbent by passage of a hot gas through the adsorbent while it is maintained in a fluent state. If the oil phase in toto is contacted with the adsorbent it is advisable to employ a polar desorbing gas such as super-heated steam; a portion of the water phase separated from the base treated liquid synthesis product is advantageously vaporized and employed to effect desorption of oxygen-containing organic compounds from an adsorbent which has been contacted with the total oil phase. Super-heated steam or vaporized base-treated water phase is also the preferred gas for desorbing oxygen-containing organic compounds which have been separated from the gas oil fraction of oil phase; the oxygen-containing organic compounds separated from the gas oil fraction are practically insoluble in water so that their separation from the condensed aqueous desorbing agent is readily effected. When the gasoline fraction is separately contacted with an adsorbent, a hot gas such as flue gas or synthesis gas is advantageously used to desorb alcohols and ketones from the absorbent; using such a desorbing agent, the low boiling oxygen-containing compounds separated from the gasoline fraction are recovered free from water.

The adsorbent is continuously regenerated by contact with the desorbing gas so that it can be returned to the adsorption zone without further treatment after separation therefrom.

In order that the invention may be more fully understood, reference will now be made to the accompanying figure wherein there is diagrammatically presented a modification of the invention.

Hydrogen and carbon monoxide are introduced from a pipe 1 into a synthesis reactor 2 wherein conversion of carbon monoxide and hydrogen into liquid hydrocarbons is effected by contact with an iron catalyst maintained in a fluent state at a temperature between 500 and 700° F. and at a pressure between 100 and 500 pounds per square inch.

An effluent comprising unconverted hydrogen and carbon monoxide, products of reaction comprising water, carbon dioxide, gaseous and liquid hydrocarbons and oxygen-containing organic compounds, issues from the synthesis reactor 2 through a pipe 3, is introduced into a heat exchanger 4 wherein the product is cooled to a temperature between 150 and 400° F. and preferably to a temperature between 200 and 300° F. without any reduction in pressure. Thereafter, the synthesis effluent is introduced through a pipe 5 into a separator 7 maintained at a temperature between 150 and 400° F. and a pressure between 150 and 500 pounds per square inch. Advantageously, the separator is maintained at a temperature between 200 and 300° F. and at a pressure substantially equivalent to that employed in the synthesis reactor 2. The effluent is separated into a gas phase and into a liquid phase comprising oil and water phases in the separator 7. Separation of the synthesis product into a gas phase and a liquid phase at elevated temperature and pressure relieves the load on the heat exchanger facilities since the liquid product is immediately thereafter raised to a temperature of 500 to 1,000° F. for the vapor phase basic treatment thereof.

The gas phase leaves the separator 7 through a pipe 8; a major portion thereof is recycled to the synthesis reactor 2 so as to maintain a recycle ratio of recycle gas to fresh feed between 1:1 and 5:1. A pipe 9 serves as a means of removing a minor portion of this recycle gas for use as a diluent in the vapor phase contacting of the oil phase with adsorbent; draw-off pipe 10 is used to remove unrecycled gas.

The two-phase liquid product is withdrawn from the separator 7 through a pipe 12, introduced into a heat exchanger 13 wherein it is raised to a temperature sufficient to vaporize the entire product, that is, a temperature of approximately 500 to 1,000° F. and generally between 700 and 1,000° F. The liquid product, still under synthesis reaction pressure, is introduced through a pipe 14 into a base-treater 15 containing a basic material of the type heretofore described.

The contacting of the liquid product in the vapor state in the base-treater 15 with a basic compound of an alkali metal or of an alkaline earth metal or of a mixture of such compounds hydrolyzes oil- and water-soluble esters to alcohols and acids and decarboxylates acids initially present together with those formed by ester hydrolysis to either hydrocarbons or ketones. Oil- and water-soluble aldehydes present in the synthesis product are polymerized by vapor phase contact with the basic material and are thereafter partially cracked to smaller molecular weight hydrocarbons and oxygen-containing hydrocarbons. The oil- and water-soluble alcohols and ketones are substantially unaffected by the vapor phase basic treatment. The alcohol and ketone content of the liquid product is substantially increased by the vapor phase basic treatment.

The base-treated liquid product with its acid, ester and aldehyde contents substantially reduced but with an increased content of alcohols, hydrocarbons and ketones, is introduced through a pipe 16 into a heat exchanger 17 wherein it is cooled to a temperature of 150 to 400° F. and preferably to approximately 250° F. The cooled base-treated product is then introduced through a pipe 20 into a separator 21 wherein it is separated into a gaseous fraction, an oil phase and a water phase.

The base-treated liquid product is advantageously separated into an oil phase and a water phase at an elevated temperature between 150 and 500 pounds per square inch and at an elevated temperature between 150 and 400° F. because normally water-soluble alcohols and ketones are thereby displaced into the oil phase. Moreover, the oil phase immediately after separation is vaporized for contact with a fluent adsorbent so that heat exchange facilities are relieved by elevated temperature-pressure separation of the base-treated liquid product.

The water phase containing alcohols and ketones is withdrawn from the separator 21 through a pipe 24. Its further treatment will be described hereinafter.

The oil phase diluted with a small amount of gaseous hydrocarbons such as ethane leaves the separator 21 through a pipe 25 and is introduced into a heat exchanger 26 wherein it is raised to a temperature between 500 and 700° F. As indicated previously the oil phase is advantageously fractionated into gasoline and gas oil fractions which are separately contacted with an adsorbent. However, in the detailed description which follows, the total oil phase is contacted with a silica gel in the interests of simplification. Vaporized base-treated water phase is employed to desorb the oxygen-containing organic compounds separated from the total oil phase. As indicated previously, hot flue gas and synthesis gas are the preferred desorbing gases when the gasoline fraction is treated separately; superheated steam and vaporized base-treated water phase are preferred desorbing gases when the gas oil is separately contacted with an adsorbent.

The heated oil phase diluted with gas phase leaves the heater 26 through a pipe 27 and is combined therein with a portion of the recycle gas phase separated from the total synthesis product. This latter gas phase comprises mainly carbon dioxide and hydrogen together with minor quantities of carbon monoxide and gaseous hydrocarbons.

Vaporized oil phase flows through the pipe 27 and is introduced into the adsorption zone 30. A hopper 31 is connected with the pipe 27 through a pipe 32 and provides a means whereby fresh silica gel adsorbent may be introduced into the adsorption zone 30.

In the adsorption zone 30 alcohols and ketones are separated from the vaporized oil phase by adsorption on silica gel. Means are provided for continuously separating the adsorbent from the vaporized oil phase. A settling zone 35 and a cyclone separator 37 are illustrative of such means.

An effluent from the adsorption zone 30 leaves the separator 30 through a pipe 38. Entrained silica gel is separated in the cyclone separator 37. Thereafter, the effluent, comprising gaseous diluent and vaporized oil phase substantially free of oxygen-containing organic compounds, is introduced through a pipe 39 into an exchanger 40 wherein it is cooled to atmospheric temperature. The cooled effluent is then passed through pipe 41 into a separator 42 wherein the gaseous diluent is separated from the condensed oil phase.

Gas phase separated from the condensed oil phase in the separator 42 is recycled through a pipe 43 for further use as a gaseous diluent in the adsorption zone 30. The pipe 43 connects with the pipe 9 through which diluent gas is introduced into the pipe 27 the conduit for introducing vaporized oil phase into adsorption zone 30.

Condensed oil phase leaves the separator 42 through a pipe 45 and is introduced into a fractionating zone 46 wherein it is separated into gasoline and gas oil fractions. The gasoline fraction is taken off overhead through a pipe 47; the gas oil fraction is withdrawn from the lower portion of the fractionating column 46 through a pipe 48. Both the gasoline and gas oil fractions are substantially free from oxygen-containing organic compounds. The hydroxyl number of both the gasoline and gas oil fractions is less than 1, indicating less than 0.5 weight per cent alcohols. The acid and ester content is negligible.

Silica gel which is removed from vaporized oil phase by means of settling zone 35 and cyclone separator 37 is introduced into a conduit 52 through which it is passed into the desorption zone; standpipes 50 and 51 connect settling zone 35 and cyclone separator 37, respectively, with conduit 52 through which the silica gel containing adsorbed alcohols and ketones is passed into the desorption zone 55. A hot gas carries the silica gel saturated with alcohols and ketones along the conduit 52 into desorption zone 55.

Gases such as methane, nitrogen, carbon dioxide, hydrogen and mixtures thereof may be used to desorb alcohols and ketones from the adsorbent and to simultaneously regenerate the adsorbent. As was indicated previously, vaporized base-treated water phase is a preferred gas for desorbing alcohols and ketones from the adsorbent.

Returning to the treatment of the base-treated water phase after its separation from the base-treated oil phase in the separator 21 and its discharge therefrom through pipe 24, a major portion thereof is introduced through pipe 24 into a flash tower 57 wherein water-soluble alcohols and ketones are flashed and taken off overhead through a pipe 58 in the form of their aqueous azeotropes. The aqueous azeotropes can be fractionated into individual alcohols and ketones in fractionating columns not shown. A reject water phase is removed from the flash tower 57 through a pipe 59 and may be disposed of by pouring into a river without fear of polluting it. The reject water phase contains less than 0.2 per cent oxygen-containing organic compounds.

A minor portion of the base-treated water phase is diverted from pipe 24 through pipe 60 to a heat exchanger 61 wherein it is vaporized and raised to a temperature of approximately 500 to 800° F. Superheated steam containing water-soluble alcohols and ketones leaves the heat exchanger 61 through a pipe 62 and flows into the pipe 52 through which silica gel containing adsorbed oil-soluble alcohols and ketones is transported from the adsorption zone 30 to the desorption zone 55. The superheated steam carries the adsorbent into the desorption zone 55 wherein alcohols and ketones are stripped from the adsorbent by the superheated steam at a temperature of about 600° F. The superheated steam also regenerates the silica gel so that it may be returned to the adsorption zone for separation of further quantities of oil-soluble alcohols and ketones from the oil phase.

A settling zone 65 within the desorption zone 55 and a cyclone separator 66 are employed to separate desorbed and regenerated adsorbent from steam. Standpipes 68 and 69 connect settling zone 65 and cyclone separator 66 respectively with the pipe 27 through which vaporized oil phase is introduced into the adsorption zone 30; regenerated adsorbent is introduced into the pipe 27 by means of standpipes 68 and 69 and is returned through pipe 27 to the adsorption zone 30.

The effluent from the desorption zone 55 comprises steam, oil-soluble alcohols and ketones and a small portion of water-soluble alcohols and ketones. The effluent is introduced through a pipe 70 into the cyclone separator 66 wherein entrained silica gel is separated, and is thereafter introduced into a heat exchanger 71 through a pipe 72. The effluent is cooled to atmospheric temperature in the exchanger 71 and is introduced through a pipe 73 into a separator 74 in the form of a condensate. The pipe 82 serves to remove uncondensed material from separator 74. Oil-soluble alcohols and ketones which are substantially insoluble in water are withdrawn from the separator 74 through a pipe 75. These oil-soluble alcohols and ketones can be fractionated into individual components in fractionating apparatus not shown.

Water, containing water-soluble alcohols and ketones, is withdrawn from the separator 74 through pipe 76 and after having been heated in an exchanger 77 is introduced through a pipe 78 into a flash tower 79. In the flash tower 79 water-soluble alcohols and ketones are flashed from the water in the form of their alcohol- and ketone-water azeotropes which are taken off overhead through a pipe 80. Reject water is withdrawn from the flash tower 79 through a pipe 81. This reject water phase also contains less than 0.2 per cent oxygen-containing organic compounds and can be disposed of without causing a pollution problem.

The foregoing detailed description presents a modification of the combination process of the present invention. It will be recognized that many modifications may be made in the above detailed description. Adsorbents other than silica-gel, separation temperatures other than those recommended are alternatives which may be employed. Moreover, it is recommended that the oil phase be separated into gasoline and gas oil fractions which are separately contacted in the vapor state with a fluent adsorbent.

Obviously many modifications and variations of the invention, as hereinbefore set forth, may be made without departing from the spirit and scope thereof, and therefore only such limitations should be imposed as are indicated in the appended claims.

We claim:

1. A process for treating a product containing water, hydrocarbons and oxygen-containing organic compounds comprising alcohols, esters, acids, aldehydes and ketones and which is obtained by the catalytic conversion of carbon monoxide and hydrogen into synthetic fuel which comprises separating the synthesis product obtained by catalytic conversion of synthesis gas into a gas phase and a liquid phase comprising oil and water phases, contacting said entire liquid phase in the vapor state at a temperature of 500 to 1,000° F. with a solid basic material selected from the group consisting of alkali metal compounds, alkaline earth compounds and mixtures thereof whereby esters are hydrolyzed to alcohols and acids and acids are decarboxylated to hydrocarbons and ketones, cooling said base-treated liquid phase, separating said base-treated liquid phase into an oil fraction and a water fraction, vaporizing said oil fraction containing oxygenates mainly in the form of alcohols and ketones, contacting said oil fraction with a particulate adsorbent at a temperature of 400 to 700° F. whereby said oxygen-containing organic compounds, mainly alcohols and ketones, are adsorbed on said adsorbent, separating said adsorbent containing oxygen-containing organic compounds adsorbed thereon from said vaporized oil fraction and recovering oxygen-containing organic compounds comprising mainly alcohols and ketones from said separated adsorbent.

2. A process according to claim 1 in which the particulate adsorbent is silica gel.

3. A process for treating a product containing water, hydrocarbons and oxygen-containing organic compounds comprising alcohols, esters, acids, aldehydes and ketones and which is obtained by the catalytic conversion of carbon monoxide and hydrogen into synthetic fuel, which comprises separating the synthesis product obtained by catalytic conversion of synthesis gas into a gas phase and a liquid phase comprising oil and water phases, contacting said entire liquid phase in the vapor state at a temperature of 500 to 1,000° F. with a solid basic material selected from the group consisting of alkali metal compounds, alkaline earth compounds and mixtures thereof whereby esters are hydrolyzed to alcohols and acids and acids are decarboxylated to hydrocarbons and ketones, cooling said base-treated liquid phase, separating said base-treated liquid phase into an oil fraction and a water fraction, vaporizing said oil fraction containing oxygenates mainly in the form of alcohols and ketones, contacting said oil fraction with a particulate fluent adsorbent at a temperature of 400 to 700° F. whereby oxygen-containing organic compounds, mainly alcohols and ketones, are adsorbed on said adsorbent separating said adsorbent containing oxygen-containing organic compounds adsorbed thereon from said vaporized oil fraction, introducing said adsorbent into a desorption zone, contacting said adsorbent with a desorbing gas at elevated temperature whereby oxygen-containing organic compounds are desorbed from said adsorbent and recovering said desorbed oxygen-containing organic compounds comprising mainly alcohols and ketones.

4. A process according to claim 3 in which a portion of vaporized base-treated water phase is used as the desorbing gas at a temperature between 500 and 800° F.

5. A process for treating a product containing water, hydrocarbons and oxygen-containing organic compounds comprising alcohols, esters, acids, aldehydes and ketones and which is obtained by the catalytic conversion of carbon monoxide and hydrogen into synthetic fuel, which comprises separating the synthesis product obtained by catalytic conversion of synthesis gas into a gas phase and a liquid phase comprising oil and water phases, contacting said entire liquid phase in the vapor state at a temperature of 500 to 1,000° F. with a solid basic material selected from the group consisting of alkali metal compounds, alkaline earth compounds and mixtures thereof whereby esters are hydrolyzed to alcohols and acids and acids are decarboxylated to hydrocarbons and ketones, cooling said base-treated liquid phase, separating said base-treated liquid phase into an oil fraction and a water fraction, vaporizing said oil fraction containing oxygenates mainly in the form of alcohols and ketones, combining a portion of said gas phase separated from synthesis product with said vaporized oil fraction, contacting said oil fraction and gas phase with a particulate fluent adsorbent at a temperature of 400 to 700° F. whereby oxygen-containing organic compounds, mainly alcohols and ketones, are adsorbed on said adsorbent, separating said adsorbent from said vaporized oil phase, introducing said adsorbent into a desorption zone, contacting said adsorbent with a vaporized portion of said base-treated water fraction at an elevated temperature of 500 to 800° F. whereby oxygen-containing organic compounds are desorbed from said adsorbent and recovering said desorbed oxygen-containing organic compounds comprising mainly alcohols and ketones.

6. A process for treating a product containing water, hydrocarbons and oxygen-containing organic compounds comprising alcohols, esters, acids, aldehydes and ketones and which is obtained by the catalytic conversion of carbon monoxide and hydrogen into synthetic fuel, which comprises separating the synthesis product obtained by catalytic conversion of synthesis gas into a gas phase and a liquid phase comprising oil and water phases, contacting said entire liquid phase in the vapor state at a temperature of 500 to 1,000° F. with a solid basic material selected from the group consisting of alkali metal compounds, alkaline earth compounds and mixtures thereof whereby esters are hydrolyzed to alcohols and acids and acids are decarboxylated to hydrocarbons and ketones, cooling said base-treated liquid phase, separating base-treated liquid phase into an oil fraction and a water fraction, dividing said oil fraction into a gasoline fraction and a gas oil fraction, vaporizing said gasoline and gas oil fractions containing oxygenates mainly in the form of alcohols and ketones, contacting said gasoline fraction and said gas oil fraction individually with particulate fluent adsorbents, at a temperature of 400 to 700° F. whereby oxygen-containing organic compounds, mainly alcohols and ketones, are adsorbed on said adsorbents, separating said adsorbents from said gasoline and gas oil fractions, separately treating the adsorbents from the gasoline fraction and the gas oil fractions in desorption zones with a vaporized portion of said base-treated water fraction at an elevated temperatures of 500 to 800° F. whereby oxygen-containing organic compounds are desorbed from said adsorbents and recovering said desorbed oxygen-containing organic compounds comprising mainly alcohols and ketones.

7. A process according to claim 6 in which the adsorbent is silica gel.

HOWARD V. HESS.
GEORGE B. ARNOLD.
MARVIN L. DRABKIN.

References Cited in the file of this patent

UNITED STATES PATENTS

| Number | Name | Date |
|---|---|---|
| 1,577,534 | Miller | Mar. 23, 1926 |
| 1,684,640 | Schmidt et al. | Sept. 18, 1928 |
| 2,410,642 | Farkas et al. | Nov. 5, 1946 |
| 2,425,535 | Hibshman | May 12, 1947 |
| 2,449,402 | Lipkin et al. | Sept. 14, 1948 |
| 2,457,257 | Michael et al. | Dec. 28, 1948 |
| 2,523,149 | Scheeline | Sept. 19, 1950 |

FOREIGN PATENTS

| Number | Country | Date |
|---|---|---|
| 350,502 | Great Britain | June 15, 1931 |